E. F. W. ALEXANDERSON.
SINGLE PHASE MOTOR.
APPLICATION FILED SEPT. 2, 1909.
1,021,289.
Patented Mar. 26, 1912.
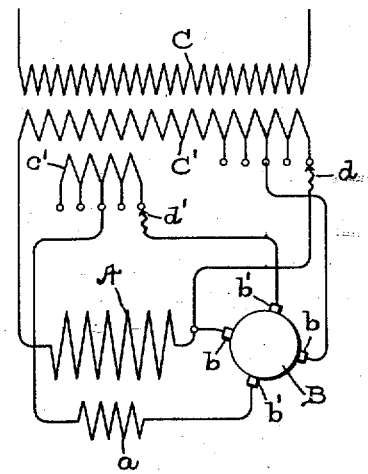
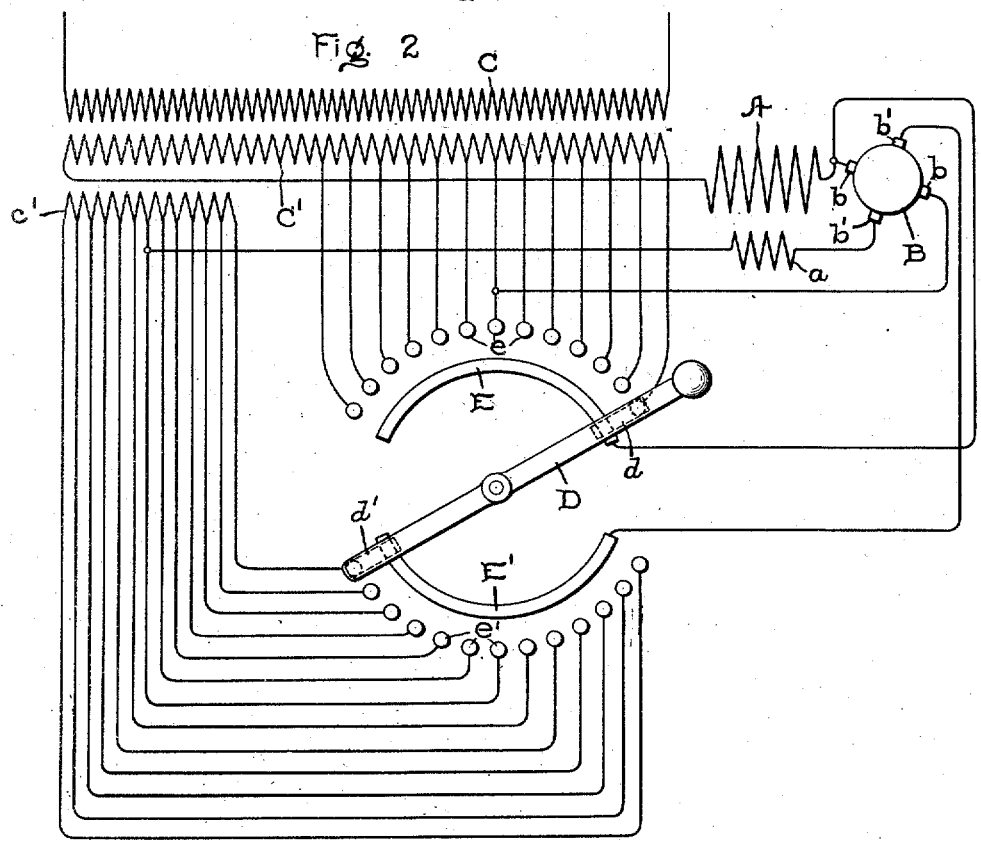
WITNESSES:
INVENTOR
ERNST F. W. ALEXANDERSON.
BY
ATT'Y.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

SINGLE-PHASE MOTOR.

1,021,289. Specification of Letters Patent. Patented Mar. 26, 1912.

Application filed September 2, 1909. Serial No. 515,771.

*To all whom it may concern:*

Be it known that I, ERNST F. W. ALEXANDERSON, a citizen of the United States, residing at Schenectady, in the county of Schenectady and State of New York, have invented certain new and useful Improvements in Single-Phase Motors, of which the following is a specification.

My invention relates to single phase motors of the commutator type in which an inducing winding is placed on the stator and two circuits are closed through the rotor winding displaced from each other approximately 90 electrical degrees. The speed of such a motor may be controlled by varying the voltage on one set of brushes, the speed being substantially constant for any given value of voltage impressed on the brushes, and the power factor of the motor may be controlled by impressing a variable voltage on the other set of brushes.

The object of my invention is to improve the operation and control of motors of this type and consists in a novel arrangement for obtaining upon the brushes the variable values of voltage for controlling the speed and improving the power factor of such motors. The further novelties of my invention are pointed out with more particularity in the claims annexed to and made a part of this specification.

My invention will best be understood by reference to the accompanying drawing in which—

Figure 1 shows diagrammatically a motor arranged for control in accordance with my invention, and Fig. 2 shows diagrammatically the arrangement of the controlling switch.

In the drawing, A represents the inducing winding on the stator and B the rotor winding, which is provided with two sets of commutator brushes. One set of brushes $b\ b$ is displaced by a small angle from the line of magnetization of the inducing winding, while the second set of brushes $b'\ b'$ is displaced approximately 90 electrical degrees from the first set.

C represents the primary, and C' the secondary of a transformer for supplying current to the motor.

$c'$ represents an auxiliary secondary winding, and $a$ represents an auxiliary winding on the stator of the motor in inductive relation to the inducing winding A. The left-hand terminal of winding A and the right-hand brush $b$ are connected to fixed points on the secondary winding C'. The other terminal of winding A and the left-hand brush $b$ are connected to the contact $d$ adapted to make connections to different points on the secondary winding C'. By moving the contact $d$ the motor speed is controlled by impressing a variable voltage across the brushes $b\ b$. At starting the contact $d$ is in such a position, with respect to the connection to the right-hand brush $b$, that the voltage impressed on the brushes $b\ b$ is in opposition to the voltage induced in the rotor winding between these brushes by the inducing winding. To increase the motor speed the contact $d$ is moved so as first to reduce the voltage impressed on the brushes $b\ b$, then to short-circuit these brushes at about synchronous speed, and then to impress on the brushes a voltage in the opposite direction for operation above synchronism. The brushes $b'\ b'$ have in circuit with them the auxiliary winding $a$ and the transformer secondary winding $c'$. A movable contact $d'$ is included in these connections, so that the amount of the secondary winding $c'$ in the circuit may be varied. The voltage induced in the auxiliary winding $a$ is in phase with the voltage impressed on the inducing winding A and, consequently, in phase with the voltage of the secondary winding $c'$.

The advantage of employing the auxiliary winding $a$ in combination with the auxiliary transformer winding $c'$ is, first, that the starting torque of the motor is increased, since the current induced in the rotor winding between brushes $b'$ by the inducing winding at starting flows through the auxiliary winding $a$ and this current in the rotor winding and in the auxiliary winding $a$ produces a torque which assists in starting the motor, and, in the second place, the use of the transformer winding $c'$ in circuit with the auxiliary winding $a$ makes it unnecessary to bring out a number of leads from the auxiliary winding. The windings $a$ and $c'$ together impress on the brushes $b'$ a voltage which increases the power factor of the motor. If the contact $d'$ is moved at the same time that contact $d$ is moved, the power factor may be maintained at its maximum value for all speeds. At speeds below synchronism the voltages of windings $a$ and $c'$ are in series; near synchronism, when the brushes $b$ $b$ are short-circuited, winding $c'$ is cut out of circuit if the winding $a$ is designed for furnishing the proper voltage for maximum power factor when operating at that speed; and as the motor speed is increased above synchronism the contact $d'$ is moved so that the voltages of winding $a$ and $c'$ are in opposition. When these voltages become equal there is no voltage impressed across the brushes $b'$ and when the voltage of winding $c'$ is further increased a reverse voltage is impressed across these brushes. It will be noted that the voltages impressed on the brushes $b$ $b$ and on the brushes $b'$ $b'$ through the contacts $d$ and $d'$ respectively, are in phase with the voltage at the motor terminals and are variable independently of the motor current.

In order that the power factor may be regulated properly for all speeds, I control the contacts $d$ $d'$ by a single switch member shown at D in Fig. 2. Contact $d$, shown in dotted lines, moves over an arc-shaped contact E connected to the left-hand brush $b$ and right-hand terminal of inducing winding A, and over a series of contacts $e$ connected to points on the secondary winding $C'$. Contact $d'$ moves over an arc-shaped contact $E'$ connected to the upper brush $b'$ and over a series of contacts $e'$ connected to points on the secondary winding $c'$.

I do not desire to limit myself to the particular constructions and arrangement of parts shown and described, but aim in the appended claims to cover all modifications which are within the scope of my invention.

What I claim as new and desire to secure by Letters Patent of the United States, is:

1. A single phase motor of the commutator type having an inducing winding on the stator, connections forming with the rotor winding a circuit in inductive relation to said inducing winding, a source of variable voltage included in said circuit, a second set of connections establishing a circuit through the rotor winding displaced approximately 90 electrical degrees from the first mentioned rotor circuit, an auxiliary winding on the stator in inductive relation to the inducing winding included in said second circuit, and a source of voltage external to the motor also included in said second circuit, said voltage being in phase with the voltage at the motor terminals and variable independently of the motor current.

2. A single phase motor of the commutator type having an inducing winding on the stator, a set of commutator brushes displaced by a small angle from the line of magnetization of said inducing winding, a source of variable voltage connected to said brushes, a second set of brushes displaced approximately 90 electrical degrees from the first set, an auxiliary winding on the stator in inductive relation to said inducing winding connected in series with said second set of brushes, and a source of variable voltage external to the motor in series with said auxiliary winding and second set of brushes.

3. A single phase motor of the commutator type having an inducing winding on the stator, connections forming with the rotor winding a circuit in inductive relation to said inducing winding, a source of variable and reversible voltage included in said circuit, a second set of connections establishing a circuit through the rotor winding displaced approximately 90 electrical degrees from the first mentioned rotor circuit, an auxiliary winding on the stator in inductive relation to the inducing winding included in said second circuit, and a source of variable and reversible voltage external to the motor also included in said second circuit.

4. A single phase motor of the commutator type having an inducing winding on the stator, a set of commutator brushes displaced by a small angle from the line of magnetization of said inducing winding, a source of variable and reversible voltage connected to said brushes, a second set of brushes displaced approximately 90 electrical degrees from the first set, an auxiliary winding on the stator in inductive relation to said inducing winding connected in series with said second set of brushes, and a source of variable and reversible voltage external to the motor in series with said auxiliary winding and second set of brushes.

5. A single-phase motor of the commutator type having an inducing winding on the stator, a set of commutator brushes displaced by a small angle from the line of magnetization of said inducing winding, a source of variable voltage connected to said brushes, a second set of brushes displaced approximately 90 electrical degrees from the first set, an auxiliary winding on the stator in inductive relation to said inducing winding connected in series with said second set of brushes, and a source of voltage external to the motor in series with said auxiliary winding and said second set of brushes, said voltage being in phase with the voltage at the motor terminals and variable independently of the motor current.

6. A single phase motor of the commutator type having an inducing winding on the stator, connections forming with the rotor winding a circuit in inductive relation to said inducing winding, a second set of connections establishing a circuit through the rotor displaced approximately 90 electrical degrees from the first mentioned rotor circuit, sources of variable and reversible voltage included in the two rotor circuits respectively, and a switch for controlling said voltages simultaneously.

7. A single phase motor of the commutator type having an inducing winding on the stator, connections forming with the rotor winding a circuit in inductive relation to said inducing winding, a source of variable voltage included in said circuit, a second set of connections establishing a circuit through the rotor winding displaced approximately 90 electrical degrees from the first mentioned rotor circuit, an auxiliary winding on the stator in inductive relation to the inducing winding included in said second circuit, a source of variable voltage external to the motor also included in said second circuit, said voltage being in phase with the voltage at the motor terminals and variable independently of the motor current, and a switch for varying simultaneously the voltages in both of said rotor circuits.

In witness whereof, I have hereunto set my hand this first day of September, 1909.

ERNST F. W. ALEXANDERSON.

Witnesses:
BENJAMIN B. HULL,
MARGARET E. WOOLLEY.